(12) United States Patent
Park et al.

(10) Patent No.: US 9,066,296 B2
(45) Date of Patent: Jun. 23, 2015

(54) METHOD FOR OPERATION IN IDLE MODE FOR M2M COMMUNICATION, AND DEVICE USING SAME

(75) Inventors: Gi Won Park, Anyang-si (KR); Young Soo Yuk, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 125 days.

(21) Appl. No.: 13/991,122

(22) PCT Filed: Dec. 7, 2011

(86) PCT No.: PCT/KR2011/009434
§ 371 (c)(1),
(2), (4) Date: May 31, 2013

(87) PCT Pub. No.: WO2012/077977
PCT Pub. Date: Jun. 14, 2012

(65) Prior Publication Data
US 2013/0250831 A1 Sep. 26, 2013

Related U.S. Application Data

(60) Provisional application No. 61/420,749, filed on Dec. 7, 2010, provisional application No. 61/536,520, filed on Sep. 19, 2011, provisional application No. 61/536,523, filed on Sep. 19, 2011, provisional application No. 61/536,524, filed on Sep. 19, 2011.

(51) Int. Cl.
*H04W 52/02* (2009.01)
*H04L 5/00* (2006.01)
*H04W 4/00* (2009.01)
*H04W 68/00* (2009.01)

(52) U.S. Cl.
CPC ......... *H04W 52/0229* (2013.01); *H04L 5/0007* (2013.01); *H04L 5/0069* (2013.01); *H04L 5/0094* (2013.01); *H04W 4/005* (2013.01); *H04W 68/00* (2013.01)

(58) Field of Classification Search
CPC .................................................... H04W 52/02
USPC ........................................................ 370/311
See application file for complete search history.

(56) References Cited

U.S. PATENT DOCUMENTS

| | | | |
|---|---|---|---|
| 2006/0203712 A1* | 9/2006 | Lim et al. | 370/208 |
| 2006/0229090 A1 | 10/2006 | LaDue | |
| 2007/0287430 A1 | 12/2007 | Hosain et al. | |
| 2008/0232330 A1* | 9/2008 | Lee et al. | 370/335 |
| 2009/0170534 A1* | 7/2009 | Ryu et al. | 455/458 |
| 2009/0280840 A1* | 11/2009 | Xu et al. | 455/458 |

(Continued)

OTHER PUBLICATIONS

Hongang Li et al., "Resource Allocation for Contention Free Network Enty," In: IEEE 802.16 Broadband Wireless Access Working Group, IEEE C802.16p-11_0335, Date Submitted: Oct. 28, 2011, Texts proposal, pp. 4-5.

*Primary Examiner* — Alex Skripnikov
*Assistant Examiner* — Nicole E King
(74) *Attorney, Agent, or Firm* — McKenna Long & Aldridge LLP (57) ABSTRACT

Provided are an operation method for M2M (machine to machine) communication and a device using same. M2M equipment receives a paging message including a resource offset for indicating an offset for uplink allocation. The M2M equipment transmits a ranging request message using the uplink allocation.

6 Claims, 8 Drawing Sheets

(56) References Cited

U.S. PATENT DOCUMENTS

| | | | |
|---|---|---|---|
| 2009/0323634 A1* | 12/2009 | Kim et al. | 370/331 |
| 2010/0167756 A1 | 7/2010 | Park et al. | |
| 2010/0173651 A1* | 7/2010 | Park et al. | 455/458 |
| 2011/0268047 A1 | 11/2011 | Nath et al. | |
| 2012/0026978 A1* | 2/2012 | Jung et al. | 370/331 |
| 2012/0051300 A1* | 3/2012 | Cho et al. | 370/329 |
| 2012/0063423 A1* | 3/2012 | Cho et al. | 370/335 |
| 2013/0005342 A1* | 1/2013 | Cho et al. | 455/438 |

* cited by examiner

METHOD FOR OPERATION IN IDLE MODE FOR M2M COMMUNICATION, AND DEVICE USING SAME

This Application is a 35 U.S.C. §371 National Stage Entry of International Application No. PCT/KR2011/009434, filed Dec. 7, 2011 and claims the benefit of U.S. Provisional Application Nos. 61/420,749, filed Dec. 7, 2010, 61/536,520, filed Sep. 19, 2011, 61/536,523, filed Sep. 19, 2011, and 61/536,524, filed Sep. 19, 2011, all of which are incorporated by reference in their entirety herein.

BACKGROUND OF THE INVENTION

1. Field of the Invention

The present invention relates to wireless communication and, more particularly, to a method for operation in an idle mode for M2M (Machine To Machine) communication in a wireless communication system, and a device using the same.

2. Related Art

M2M (Machine To Machine) communication (or MTC (Machine Type Communication)) is a type of data communication including one or more entities not requiring human interactions. Namely, M2M communication refers to a concept of communication performed by a mechanical device, rather than by a terminal used by human beings, by using a wireless communication network. A mechanical device used for M2M communication may be called an M2M device, and M2M devices include various devices such as a vending machine, a machine for measuring a water level of a dam, and the like.

Since the properties of M2M devices are different from those of general terminals, services optimized for M2M communication may be different from services optimized for human-to-human communication. M2M communication. Compared with current mobile network communication services, M2M may be characterized by different market scenarios, data communication, small cost and efforts, a potentially very large amount of M2M devices, a wide service range, low traffic per M2M device, and the like.

An idle mode is a mode in which a terminal wakes up for a particular section to transmit and receive data in order to reduce battery consumption. A network re-entry process refers to a process in which a terminal is recovered from an idle mode to a network-connected state.

An operation of an M2M device in an idle mode in consideration of the characteristics of M2M communication is required.

SUMMARY OF THE INVENTION

An aspect of the present invention provides a method for operation in an idle mode for M2M (Machine To Machine) communication and a device using the same.

In an aspect, a method of operation in an idle mode for Machine To Machine (M2M) communication is provided. The method includes receiving, by a M2M device in the idle mode, a paging message from a base station, the paging message including an action code, an access type and a resource allocation, the action code indicating that the M2M device perform a ranging for a network reentry, the access type indicating a type for the network reentry, the resource offset indicating an offset for an uplink assignment if the access type indicates a dedicated ranging channel allocation, and transmitting, by the M2M device, a ranging request message to the base station by using the uplink assignment.

The method may further include receiving, by the M2M device, the uplink assignment based on the resource offset.

The resource offset may indicate the offset that the M2M device starts to monitor the uplink assignment.

The paging message may further include a group identifier that identifies a group to which the M2M device belongs.

The M2M device may terminate the idle mode upon receiving the paging message.

In another aspect, a device for Machine To Machine (M2M) communication is provided. A device includes a radio frequency unit configured to receive and transmit a radio signal, and a processor operatively coupled with the radio frequency unit and configured to receive a paging message from a base station while operated in an idle mode, the paging message including an action code, an access type and a resource allocation, the action code indicating that the device perform a ranging for a network reentry, the access type indicating a type for the network reentry, the resource offset indicating an offset for an uplink assignment if the access type indicates a dedicated ranging channel allocation, and transmit a ranging request message to the base station by using the uplink assignment.

An M2M device can promptly re-enter a network in M2M communication, and battery consumption due to performing network re-entry can be reduced.

DESCRIPTION OF EXEMPLARY EMBODIMENT

Figure 1:
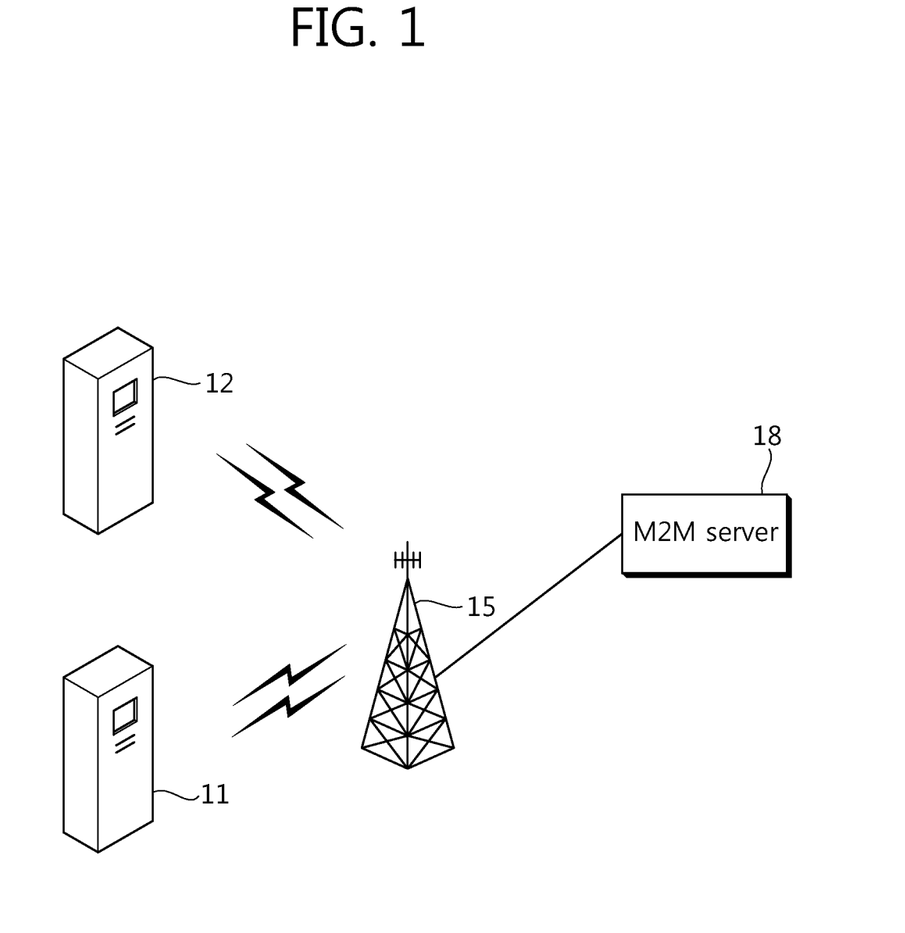
FIG. 1 a view illustrating an example of M2M (Machine To Machine) communication.

FIG. 1 a view illustrating an example of M2M (Machine To Machine) communication.

M2M communication, also known as MTC (Machine Type Communication), refers to exchanging information between M2M devices 11 and 12 via a base station (BS) 15 not involving human interactions or exchanging information between an M2M device 11 and an M2M server 18.

The M2M server 18 is an entity communicating with the M2M device 11. The M2M server 18 executes an M2M application and provides an M2M-specific service to the M2M device 11.

The M2M device 11, a wireless device providing M2M communication, may be fixed or mobile. The M2M device may also be known as an MTC device.

A service provided through M2M communication is different from an existing service in communication involving humans, and includes various services such as tracking, metering, payment, a medical service, remote control, and the like.

Typical examples of individual service requirements of M2M features are as follows.

1) Time controlled characteristics: It refers to that an M2M device transmits or receives data in only a predefined particular section. Thus, unnecessary signaling outside the predefined particular section can be prevented.

2) Time tolerant characteristics: It refers to that the M2M device can delay data transmission. When a network load is greater than a predetermined threshold value, a network operator may limit connection of the M2M device to a network or data transmission from the M2M device to a different MTC device, or the like, and dynamically limit an amount of data an MTC device may be able to transmit in a particular region.

3) Offline indication characteristics: When signaling between an M2M device and a network is no more available, the M2M device is requested to notify accordingly at an appropriate time.

4) Priority alarm message (PAM) characteristics: When an M2M device is exposed to burglary, vandalism, or emergency that requires immediate attention, alarm sounds for a network preferentially.

Disposition of hundreds to thousands of M2M devices in a single cell (or base station) is considered. Thus, it is difficult to identify each M2M device with only an existing terminal identifier, and following identifiers are taken into consideration.

Station identifier (STID): It is an identifier identifying an M2M device in a domain of a base station (BS). A BS may allocate the same STID to a plurality of M2M devices.

M2M group identifier (MGID): it is an identifier used to uniquely identify an M2M device group in a region of a network entity that allocates an MGID.

Hereinafter, an idle mode operation in an IEEE 802.16m-based system will be described with reference to IEEE (Institute of Electrical and Electronics Engineers) P802.16m/D10 "Part 16: Air Interface for Broadband Wireless Access Systems: Advanced Air Interface" posted in Nov. 24, 2010. However, a wireless communication system to which the present invention is applied is not limited to the IEEE 802.16m-based system, and the present invention may be applied to various wireless communication systems such as 3GPP (3rd Generation Partnership Project) LTE (long term evolution).

Figure 2:
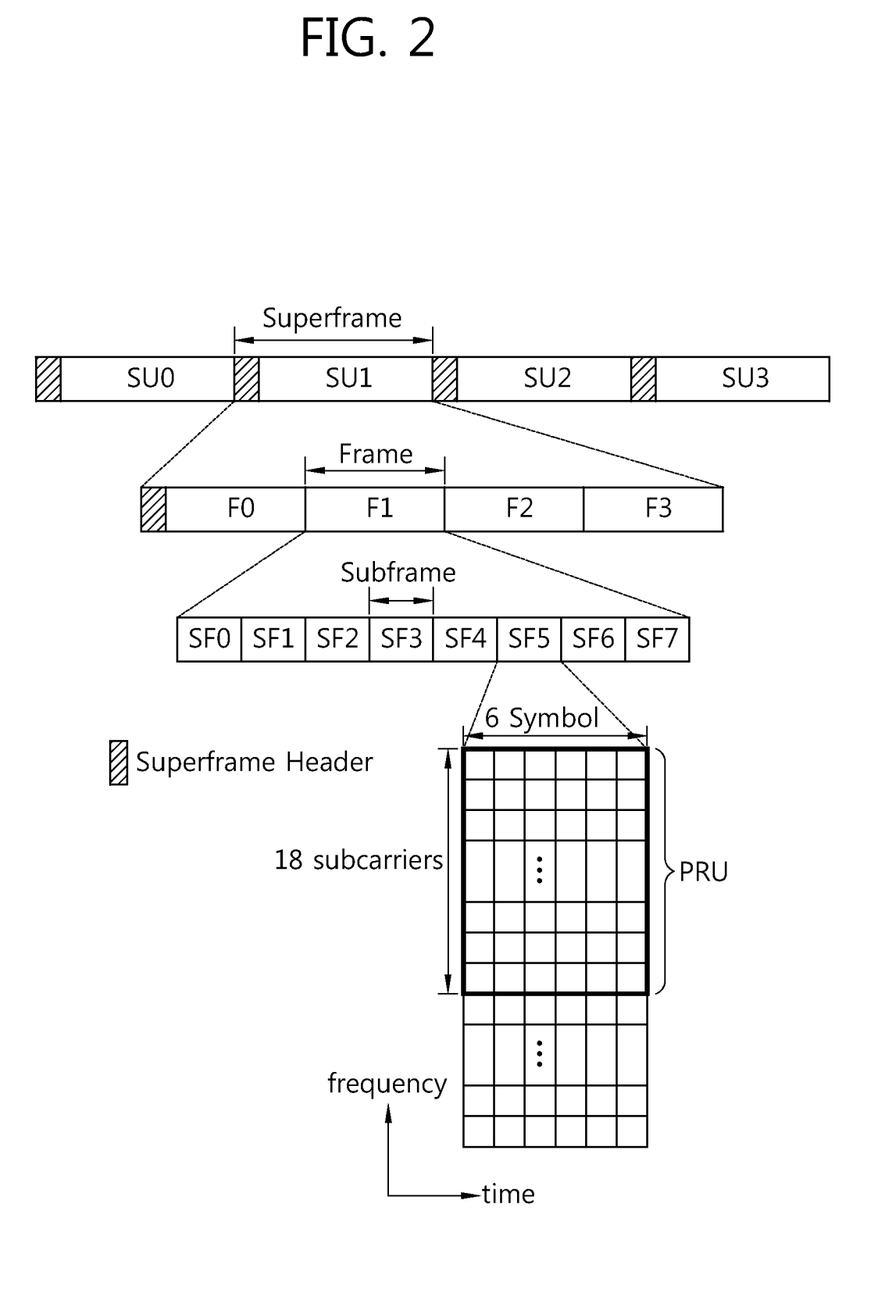
FIG. 2 is a view illustrating an example of a frame structure of an IEE 820.16m system.

FIG. 2 is a view illustrating an example of a frame structure of an IEEE 820.16m system.

A superframe includes a superframe header and four frames F0, F1, F2, and F3. Lengths of the respective frames within the superframe may be equal. A size of the superframe is 20 ms and a size of each frame is 5 ms.

A frame includes a plurality of subframes SF0, SF1, SF2, SF3, SF4, SF5, SF6, and SF7. A subframe may be used for uplink transmission or downlink transmission. A subframe includes a plurality of OFDM (orthogonal frequency division multiplexing) symbols in a time domain. An OFDM symbol expresses a single symbol period, but a multi-access scheme is not limited to whatever it is named.

A subframe includes six OFDM symbols. However, it is merely illustrative and a subframe may include five, seven, or nine OFDM symbols without any limitation.

A subframe type may be defined according to the number of OFDMA symbols included in a subframe. For example, Type-1 subframe may be defined to include six OFDMA symbols, Type-2 subframe may be defined to include seven OFDMA symbols, Type-3 subframe may be defined to include five OFDMA symbols, and Type-4 subframe may be defined to include nine OFDMA symbols.

Time division duplex (TDD) or frequency division duplex (FDD) may be applied to a frame. Subframes included in a TDD frame may be divided into an uplink subframe and a downlink subframe.

A size of a superframe (SF), the amount of frames included in an SF, the amount of subframes included in a frame, and the amount of OFDM symbols in a subframe may vary, without being limited.

A superframe header (SFH) may carry an essential system parameter and system configuration information. The SFH may be transmitted in the last five OFDM symbols of a first subframe in a superframe.

A physical resource unit (PRU) is a basic resource allocation (or assignment) unit, including eighteen subcarriers in continuous OOFDM symbols of the same subframe.

In an IEEE 802.16 system, an advance-MAP (A-MAP) carries service control information. A non-user specific A-MAP carries information not limited to a particular user or a particular user group. A hybrid automatic repeat request (HARQ) feedback A-MAP carries HARQ ACK/NACK information with respect to uplink data transmission. A power control A-MAP carries a power control command to a mobile station (MS).

An allocation A-MAP carries resource allocation information. An allocation A-MAP includes several types such as a downlink (DL) basic allocation A-MAP, an uplink (UL) basic allocation A-MAP, a code division multiple access (CDMA) allocation A-MAP, and the like.

The CDMA allocation A-MAP includes US resource allocation according to a band request or UL resource allocation according to a ranging request.

Every A-MAP shares a physical resource region known as A-MAP region. The A-MAP region exists in every DL subframe.

Figure 3:
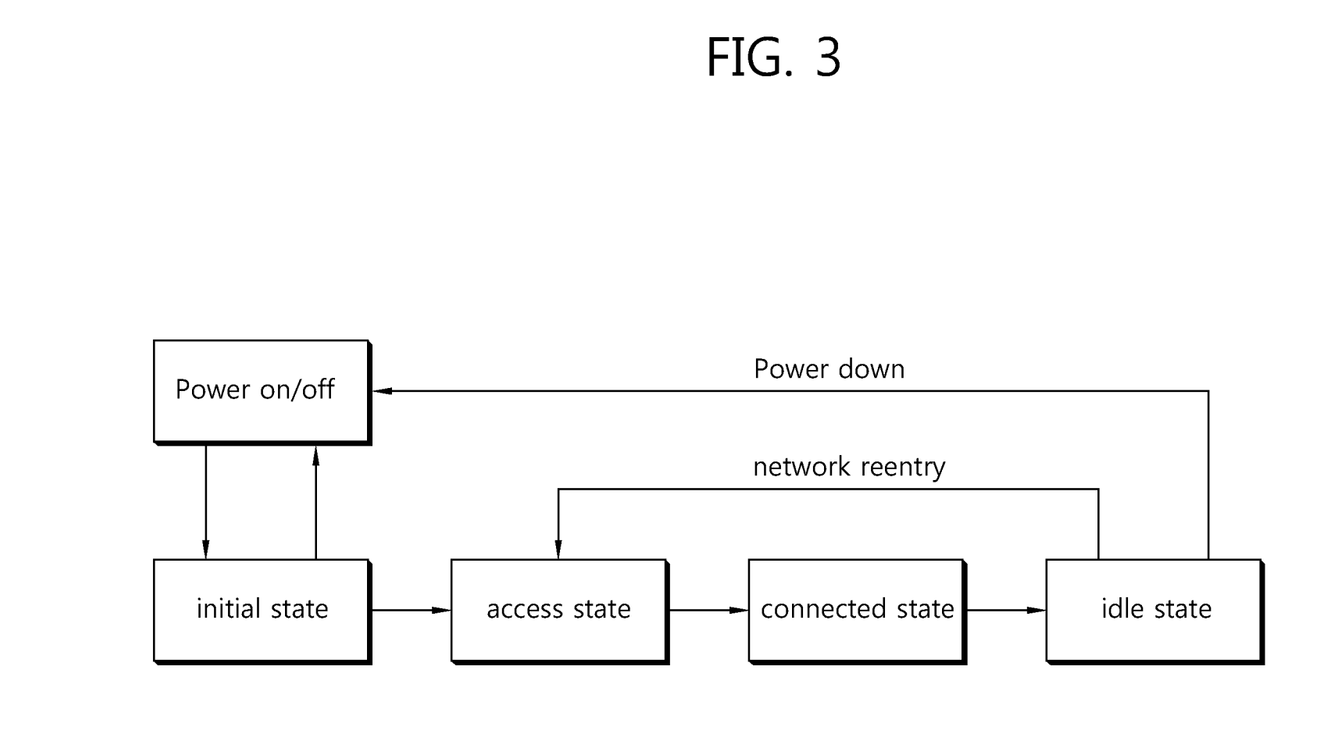
FIG. 3 is a diagram of operation transition in IEEE 820.16m.

FIG. 3 illustrates an operation transition diagram in IEEE 802.16m.

In an initial state, a mobile station (MS) receives synchronization and system configuration and performs cell selection.

In an access state, an MS performs network entry. Network entry is a procedure including ranging, basic capability negotiation, and authentication.

In a connected state, an MS operates in one of a sleep mode, an active mode, and a scanning mode. In the connected state, the MS maintains connection established in the access state. In a sleep mode, a radio frame is divided into a sleep window and a listening window. In the sleep mode, an MS may receive data from a base station during the listening window. In a scanning mode, an MS may perform measurement instructed by a BS.

In an idle state, an MS operates in an idle mode. In the idle mode, a paging available interval and a paging unavailable interval exist. A BS does not transmit downlink traffic, such as a paging message, or the like, in the paging unavailable interval.

Figure 4:
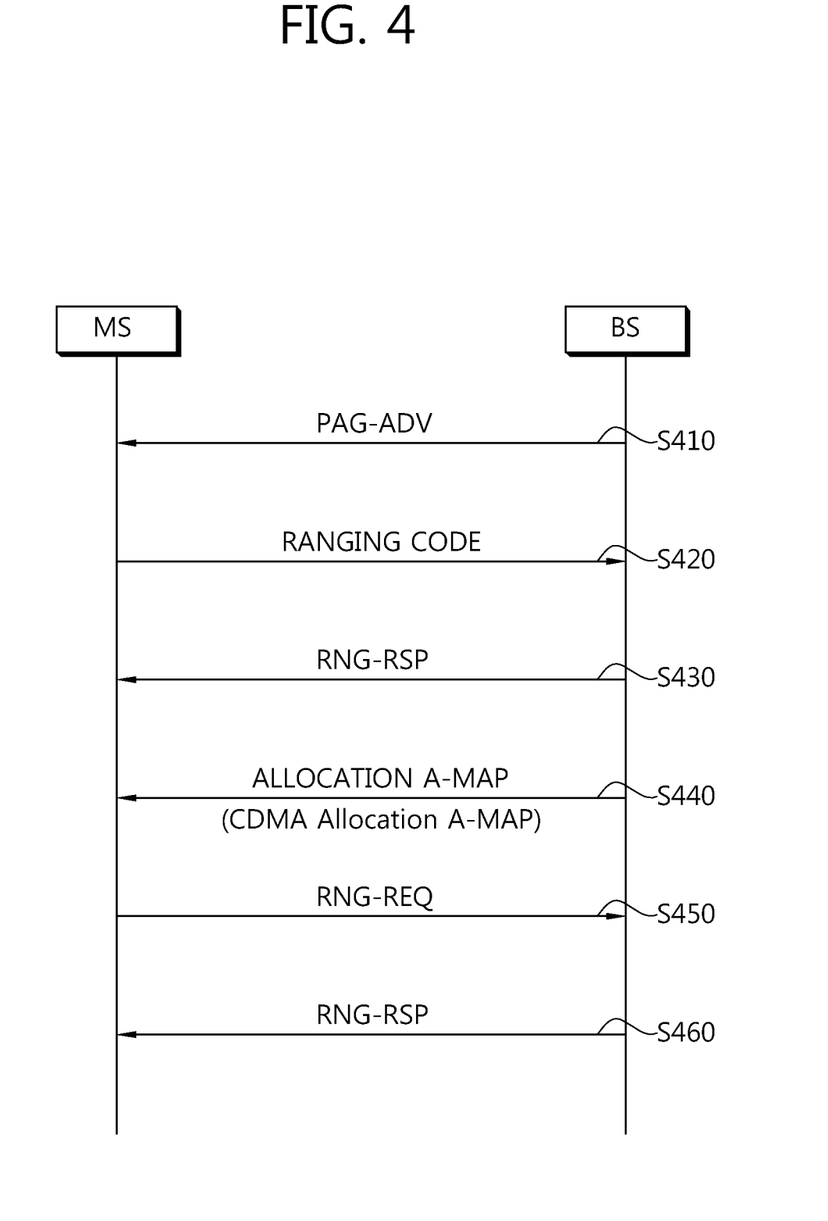
FIG. 4 is a flow chart illustrating an operation in an idle mode in IEEE 802.16m.

FIG. 4 is a flow chart illustrating an operation in an idle mode in IEEE 802.16m.

In operation S410, in an idle mode, an MS monitors reception of a paging message during a paging available interval and receives a paging advertisement (PAG-ADV) message. The paging message is a notification message indicating whether or not there is downlink message pending to a particular MS.

The BS may instruct each MS to perform ranging for network reentry or location updating through the PAG-ADV message.

In operation S420, when the PAG-ADV message requests network reentry, the MS terminates the idle mode and transmits a ranging code to a BS.

In operation S430, the MS receives a ranging-response (RNG-RSP) message from the BS in response to the ranging code. The RNG-RSP message includes a status code. The status code indicates one of 'continue', 'success', and 'abort'.

When an RNG-RSP message including a status code indicating 'continue' is received, the MS transmits a ranging code again.

When the status code indicates 'success', the MS receives an allocation A-MAP in operation S440. The allocation A-MAP includes a CDMA allocation A-MAP.

In operation S450, the MS transmits an RNG-REQ (Ranging-Request) message to the BS by using UL resource allocation indicated by the CDMA allocation A-MAP.

In operation S460, the MS receives an RNG-RSP message in response to the RNG-REQ message.

In the idle mode, the MS first transmits a ranging code for network reentry. The ranging code is arbitrarily selected by the MS from a set of a plurality of codes, which is known as contention-based ranging.

In a general mobile communication system, the MS has mobility, so it is not guaranteed that UL synchronization between the BS and the MS is continuously maintained in the idle mode. Thus, the MS, which has received paging in the idle mode, first performs ranging for network reentry to perform UL synchronization.

However, in M2M communication, an M2M device does move rarely. Or, an M2M device having time controlled characteristics continuously maintains UL synchronization, eliminating the necessity of separate UL synchronization.

Thus, a network reentry process in consideration of the characteristics of M2M communication is required.

Figure 5:
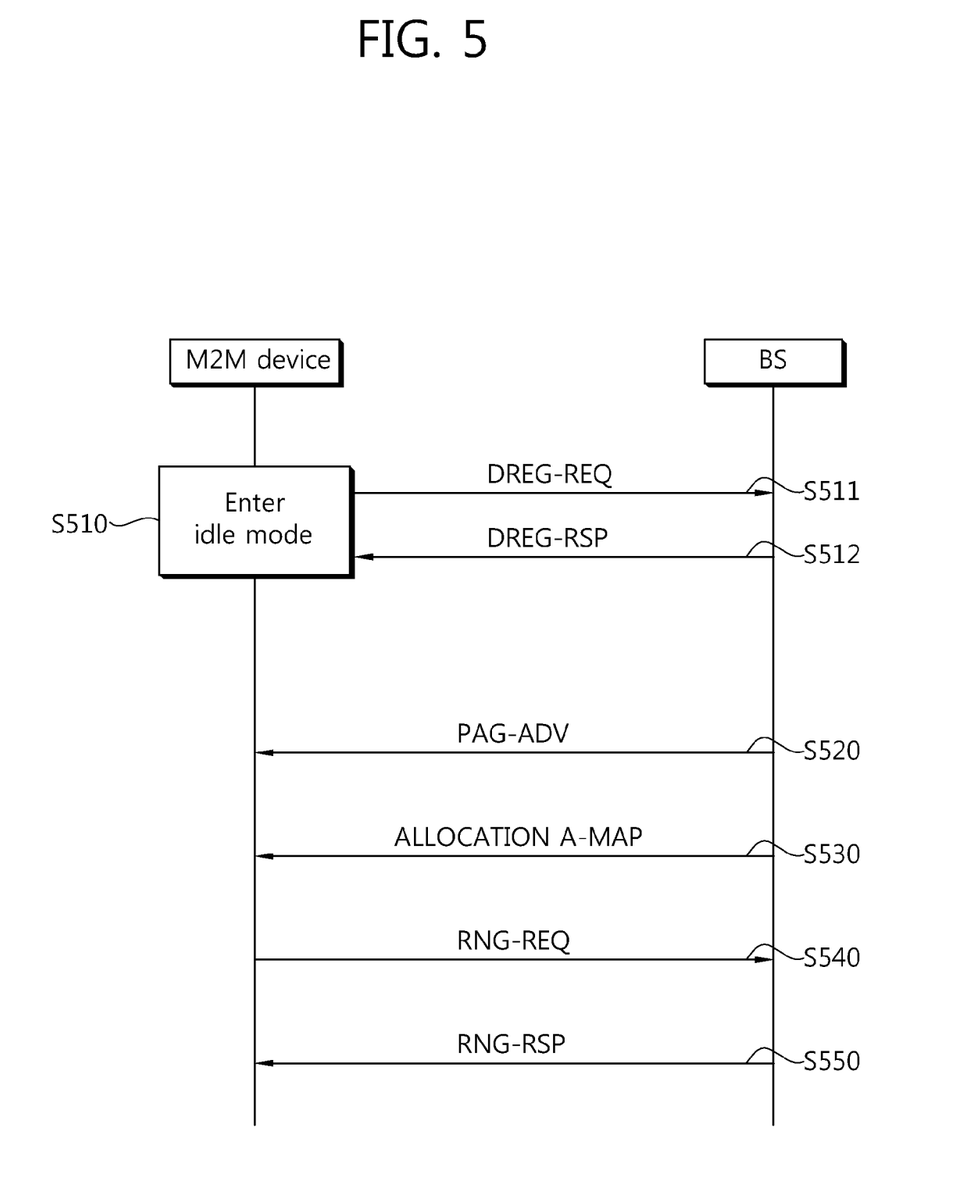
FIG. 5 is a view illustrating an operation in an idle mode according to an embodiment of the present invention.

FIG. 5 illustrates an operation in an idle mode according to an embodiment of the present invention. First, an M2M device and a BS negotiate for mobility or UL synchronization in the event of network reentry. Hereinafter, an operation of an M2M device which rarely moves or maintains UL synchronization will be described.

In operation S510, an M2M device enters an idle mode. Entering an idle mode may be performed based on a request from the M2M device or a command from a BS.

In order for the M2M device to enter the idle mode, the M2M device transmits a deregistration-request (DREG-REG) message requesting entry into an idle mode, to the BS in operation S511. In operation S512, the M2M device receives a deregistration-response (DREG-RSP) message indicating initiation of an idle mode from the BS.

Alternatively, the BS may transmit a deregistration-command (DREG-CMD) message instructing the M2M device to enter an idle mode.

In operation S520, in the idle mode, the M2M device monitors reception of a paging message during a paging available interval and receives a PAG-ADV message. The PAG-ADV message instructs the M2M device to perform network reentry.

The proposed PAG-ADV message includes resource offset information regarding an allocation A-MAP carrying resource allocation used for transmission of the RNG-REQ message.

Upon receiving the PAG-ADV message, the M2M device terminates the idle mode and starts a network reentry process.

In operation S530, the M2M device receives an allocation A-MAP based on the resource offset information included in the PAG-ADV message. The allocation A-MAP includes UL allocation for transmission of the RNG-REQ message. The allocation A-MAP for RNG-REQ may use an existing CDMA allocation A-MAP or a ranging allocation A-MAP for an M2M device. A dedicated identifier of an M2M device may be masked on a cyclic redundancy check (CRC) of the ranging allocation A-MAP.

In operation S540, the M2M device transmits an RNG-REQ message to the BS by using UL allocation in the allocation A-MAP.

In operation S550, the M2M device receives an RNG-RSP message with respect to the RNG-REQ message.

Hereinafter, a method for indicating dedicated resource for an RNG-REQ message through a PAG-ADV message will be described.

In tables below, a field name, size, and field value are merely illustrative and may be easily modified to a different name or value by a person skilled in the art.

Table 1 below shows an example of fields included in a PAG-ADV message according to an embodiment of the present invention.

TABLE 1

| Field name | Size (bit) | Description |
|---|---|---|
| Action code | 1 | It indicates purpose of PAG-ADV message.<br>0b0: perform network reentry<br>01b: perform ranging for location updating |
| Access type | 3 | It indicates a type for network reentry.<br>It is given when action code is '0b0'.<br>0b000: allocate channel for RNG-REQ<br>0b001: allocate dedicated ranging channel for S-RCH(synchronized ranging channel)<br>0b010: allocate dedicated ranging channel for NS-RCH(non-synchronized ranging channel)<br>0b011~0b111: reserved |
| Identifier | | It indicates M2M device |
| Resource offset | | It is an offset indicating allocation of resource for RNG-REQ. It is given when access type is '0b000'. |

The resource offset indicates a position in which an allocation A-MAP for RNG-REQ message is transmitted. The resource offset may indicate a subframe offset in which the A-MAP for an RNG-REQ message is transmitted.

Figure 6:
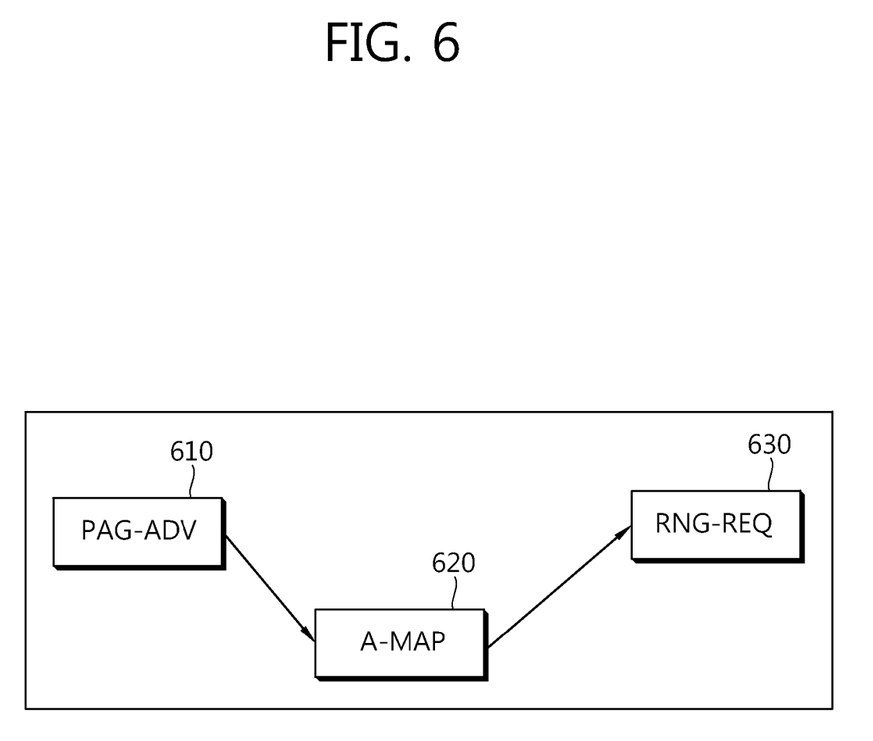
FIG. 6 is a view illustrating an example of resource allocation (or resource assignment) of RNG-REQ using a paging message.

FIG. 6 is a view illustrating an example of resource allocation of RNG-REQ using a paging message.

An M2M device receives a resource offset of a PAG-ADV message 610 and receives an allocation A-MAP 620 based on the resource offset. The M2M device transmits an RNG-REQ message 630 by using UL resource allocation within the allocation A-MAP 620.

In case of M2M communication, an MGID indicating a group of M2M devices may be included in a paging message. When a plurality of M2M devices are paged by using an MGID, a resource offset may be designated for each of the M2M devices of the group.

Table 2 below shows an example of fields included in a PAG-ADV message using an MGID.

TABLE 2

| Field | Size | Description |
|---|---|---|
| MGID | | M2M group identifier |
| Num_M2M_Devices | | Amount of M2M devices of group |
| for (i=0; | | |

TABLE 2-continued

| Field | Size | Description |
|---|---|---|
| i<Num_M2M_Devices; i++) { | | |
| Action code | | See Table 1 |
| Access type | | See Table 1 |
| Identifier | | See Table 1 |
| Resource offset | | See Table 1 |
| } | | |

When an MGID is given, it may indicate a position in which an M2M device belonging to a corresponding M2M group may monitor an allocation A-MAP, rather than that a resource offset is given individually for each M2M device.

Table 3 shows another example of fields included in a PAG-ADV message using an MGID.

TABLE 3

| Field name | Size (bit) | Description |
|---|---|---|
| MGID | | M2M group identifier |
| Action code | 1 | It indicates purpose of PAG-ADV message<br>0b0: perform network reentry<br>01b: perform ranging for location updating |
| Access type | 3 | It indicates a type for network reentry.<br>It is given when action code is '0b0'.<br>0b000: allocate channel for RNG-REQ<br>0b001: allocate dedicated ranging channel for S-RCH(synchronized ranging channel)<br>0b010: allocate dedicated ranging channel for NS-RCH(non-synchronized ranging channel)<br>0b011~0b111: reserved |
| Resource offset | | It indicates offset in which M2M device starts monitoring resource allocation (e.g., allocation A-MAP) for RNG-REQ. It is given when access type if '0b000'. |

According to Table 3, the resource offset indicates a position in which an M2M device starts monitoring UL resource allocation. The M2M device checks whether UL resource allocation is received in a position (e.g., a subframe) indicated by the resource offset. When an allocation A-MAP having UL resource allocation is received, the M2M device transmits an RNG-REQ message using UL resource allocation. If an allocation A-MAP having UL resource allocation is not received, the M2M device does not perform network reentry. Namely, when an allocation A-MAP having UL resource allocation is not received, the corresponding M2M device is considered not paged.

A paging message may directly include resource allocation for RNG-REQ instead of a resource offset. Table 4 below shows an example of a PAG-ADV message including resource allocation.

TABLE 4

| Field name | Size (bit) | Description |
|---|---|---|
| Action code | 1 | It indicates purpose of PAG-ADV message<br>0b0: perform network reentry<br>01b: perform ranging for location updating |
| Access type | 3 | It indicates a type for network reentry.<br>It is given when action code is '0b0'.<br>0b000: allocate channel for RNG-REQ<br>0b001: allocate dedicated ranging channel for S-RCH(synchronized ranging channel)<br>0b010: allocate dedicated ranging channel for NS-RCH(non-synchronized ranging channel)<br>0b011~0b111: reserved |

TABLE 4-continued

| Field name | Size (bit) | Description |
|---|---|---|
| Identifier | | It indicates an M2M device. |
| Resource index | | It indicates resource allocation for RNG-REQ.<br>It is given when access type is '0b000'. |

Resource index indicates UL resource allocation for RNG-REQ, and an M2M device may transmit an RNG-REQ message using the UL resource allocation, without receiving an A-MAP.

Table 1 to Table 4 above may be applicable without changing the structure of the existing allocation A-MAP.

Hereinafter, a case in which a dedicated A-MAP (which is called a ranging allocation A-MAP) for RNG-REQ allocation is defined will be described.

Figure 7:
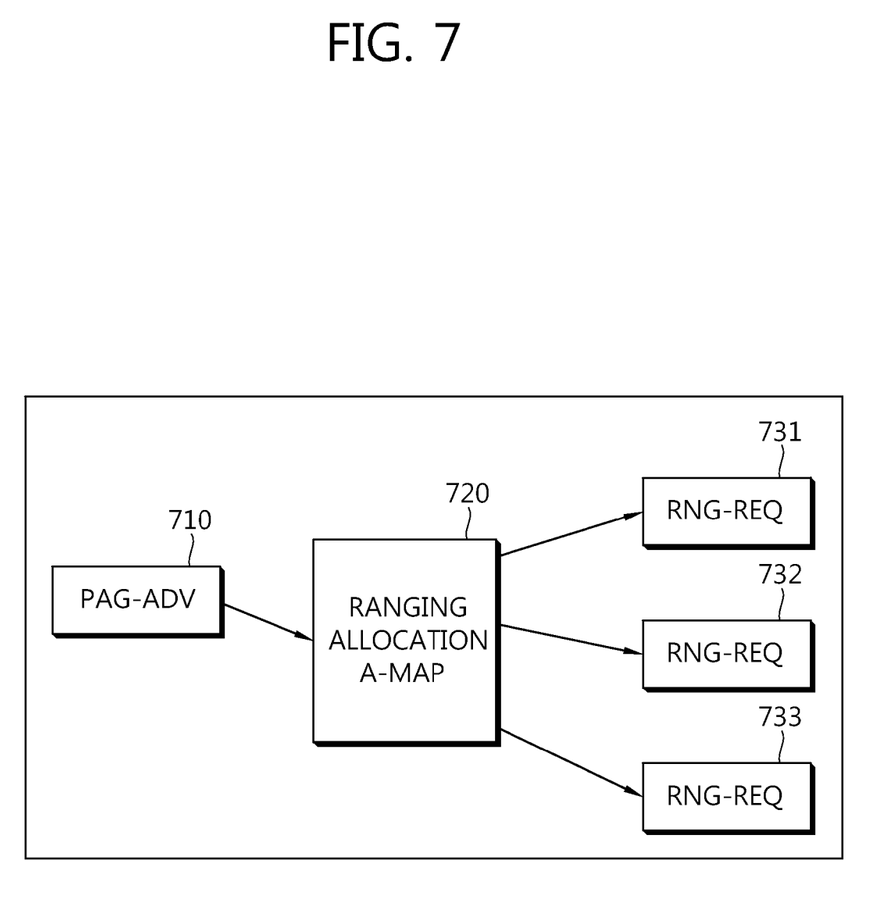
FIG. 7 is a view illustrating an example of resource allocation of RNG-REQ using ranging allocation A-MAP.

FIG. 7 is a view illustrating an example of resource allocation of RNG-REQ using ranging allocation A-MAP. A ranging allocation A-MAP 720 includes UL resource allocation for a plurality of RNG-REQ. Resource offsets in Table 1 to Table 3 may indicate an offset for the ranging allocation A-MAP 720.

M2M devices receive a resource offset for the ranging allocation A-MAP 720 of the PAG-ADV message 710, and receive the ranging allocation A-MAP 720 based on the resource offset. It is assumed that the ranging allocation A-MAP 720 include UL resource allocation for three RNG-REQs 731, 732, and 733. Each M2M device transmits a corresponding RNG-REQ message.

A method for indicating M2M devices which have received the ranging allocation A-MAP is required. Namely, it is a method for indicating three M2M devices which are to receive the ranging allocation A-MAP 720 when ten M2M devices belong to a single M2M group.

M2M devices having the same value by "MGID modulo N" may receive the same allocation A-MAP. Here, the value N may be given in advance or a BS may designate the value N and inform the M2M devices about it.

Table 5 shows an example of the PAG-ADV message indicating a ranging allocation A-MAP.

TABLE 5

| Field | Size | Description |
|---|---|---|
| MGID | | M2M group identifier |
| Sub-group indication | | 0: MGID modulo N = 0<br>1: MGID modulo N = 1<br>2: MGID modulo N = 2 |
| If (sub-group indication == 0){ | | |
| Action code | | See Table 1 |
| Access type | | See Table 1 |
| Identifier | | See Table 1 |
| Resource offset | | It indicates ranging allocation A-MAP |
| } | | |
| Repeated for each sub-group indication | | |

Table 6 shows an example of a ranging allocation A-MAP carrying UL resource allocation with respect to each M2M device.

TABLE 6

| Field | Size | Description |
|---|---|---|
| Start offset | | It is start offset of resource allocation for transmission of RNG-REQ message |
| Resource size | | It is a size of resource allocation for transmission of RNG-REQ message |

Table 7 shows an example of a ranging allocation A-MAP carrying UL resource allocation for a plurality of RNG-REQs as shown in FIG. 4.

TABLE 7

| Field | Size | Description |
|---|---|---|
| Start offset | | It is start offset of resource allocation for transmission of RNG-REQ message |
| Resource size | | It is a size of resource allocation for transmission of a single RNG-REQ message |
| End offset | | It indicates (amount of paged M2M devices * resource size). UL allocation sequentially corresponds to M2M devices belonging to sub-group. |

A network reentry process without ranging is proposed under the assumption that an M2M device which do not have mobility and periodically performs UL transmission to a BS. However, UL synchronization may not be maintained due to a change in a channel state.

Thus, when network reentry with ranging is required because UL synchronization is not maintained, a BS does not include a resource offset in a page message. Although an access type indicates channel allocation for RNG-REQ, if there is no resource offset, an M2M device starts a ranging process by transmitting a ranging code to a BS.

Figure 8:
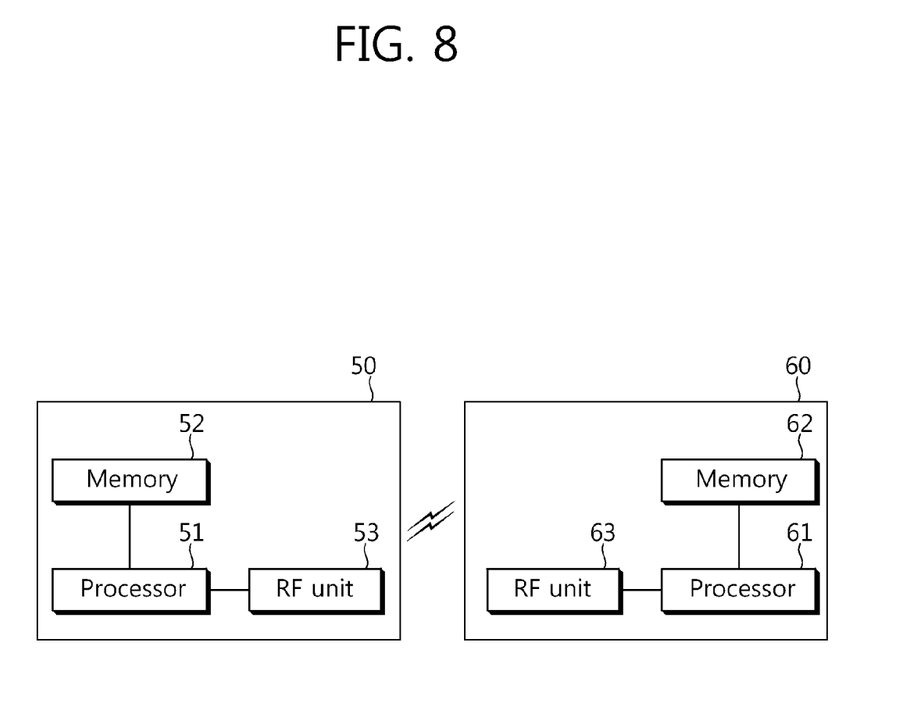
FIG. 8 is a block diagram of a wireless communication system implementing an embodiment of the present invention.

FIG. 8 is a block diagram of a wireless communication system implementing an embodiment of the present invention.

An MTC device 50 includes a processor 51, a memory 52, and a radio frequency (RF) unit 53. The memory 52 connected to the processor 51 stores various types of information for driving the processor 51. The RF unit 53 connected to the processor 51 transmits and/or receives a radio signal. The processor 51 implements a proposed function, process, and/or method. In the foregoing embodiment, the operations of the MTC device may be implemented by the processor 51.

A BS 60 includes a processor 61, a memory 62, and a radio frequency (RF) unit 63. The memory 62 connected to the processor 61 stores various types of information for driving the processor 61. The RF unit 63 connected to the processor 61 transmits and/or receives a radio signal. The processor 61 implements a proposed function, process, and/or method. In the foregoing embodiment, the operations of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of operation in an idle mode for Machine To Machine (M2M) communication, comprising:
receiving, by a M2M device in the idle mode, a paging message from a base station, the paging message including an action code, an access type and a resource offset, the action code indicating that the M2M device perform a ranging for a network reentry, the access type indicating a type for the network reentry, the resource offset indicating an offset for an uplink assignment if the access type indicates a dedicated ranging channel allocation,
wherein the paging message further includes a group identifier that identifies a group to which the M2M device belongs;
receiving, by the M2M device, the uplink assignment based on the resource offset,
wherein the resource offset indicates the offset that the M2M device starts to monitor the uplink assignment; and
transmitting, by the M2M device, a ranging request message to the base station by using the uplink assignment.

2. The method of claim 1, wherein the M2M device terminates the idle mode upon receiving the paging message.

3. The method of claim 1, wherein the uplink assignment is a code division multiple access (CDMA) allocation advanced-MAP (A-MAP).

4. A device for Machine To Machine (M2M) communication, comprising:
a radio frequency unit configured to receive and transmit a radio signal; and
a processor operatively coupled with the radio frequency unit and configured to:
receive a paging message from a base station while operated in an idle mode, the paging message including an action code, an access type and a resource offset, the action code indicating that the device perform a ranging for a network reentry, the access type indicating a type for the network reentry, the resource offset indicating an offset for an uplink assignment if the access type indicates a dedicated ranging channel allocation,
wherein the paging message further includes a group identifier that identifies a group to which the M2M device belongs;
receive the uplink assignment based on the resource offset,
wherein the resource offset indicates the offset that the M2M device starts to monitor the uplink assignment; and
transmit a ranging request message to the base station by using the uplink assignment.

5. The device of claim 4, wherein the processor is configured to terminate the idle mode upon receiving the paging message.

6. The device of claim 4, wherein the uplink assignment is a code division multiple access (CDMA) allocation advanced-MAP (A-MAP).

* * * * *